Dec. 1, 1953
W. E. SKELTON ET AL
2,661,317
SEPARATION OF WAX CONSTITUENTS AND THE LIKE FROM OIL
Filed March 17, 1949
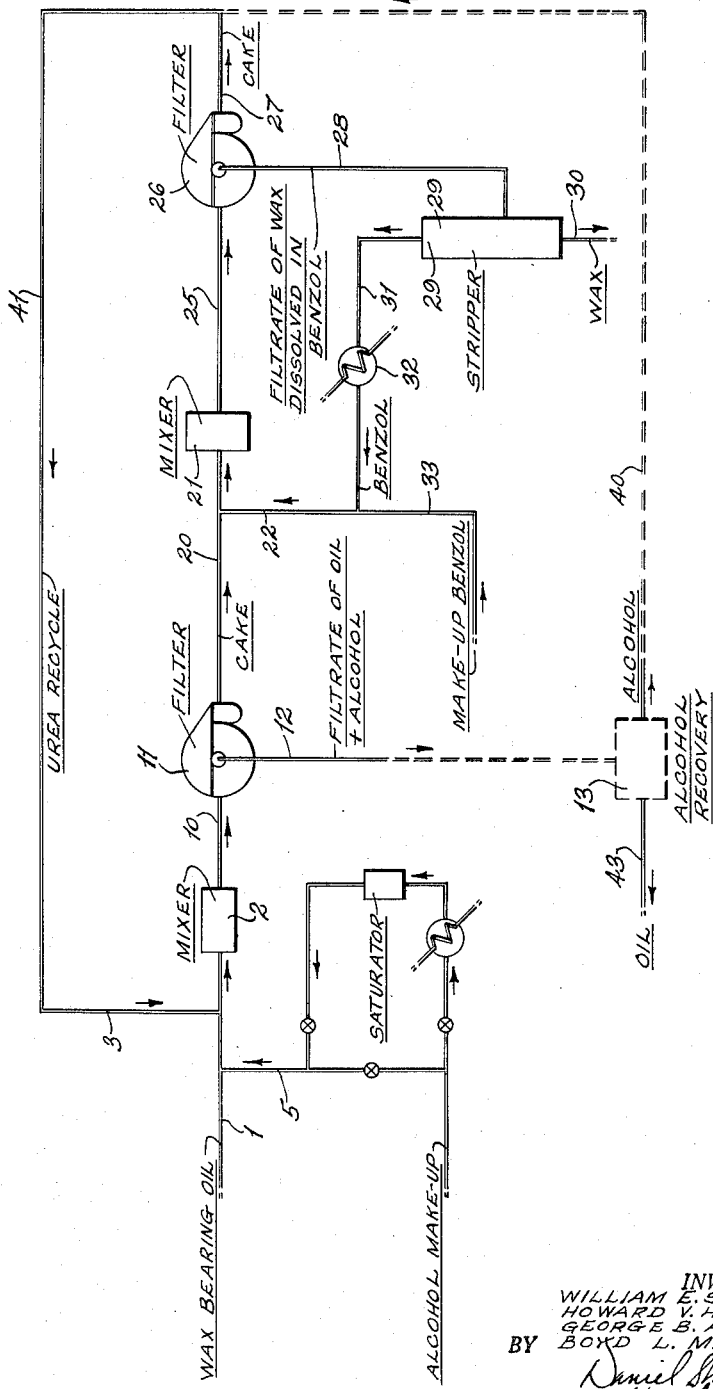
INVENTORS
WILLIAM E. SKELTON
HOWARD V. HESS
GEORGE B. ARNOLD
BY BOYD L. MAHAN
ATTORNEYS Patented Dec. 1, 1953

2,661,317

UNITED STATES PATENT OFFICE 2,661,317

SEPARATION OF WAX CONSTITUENTS AND THE LIKE FROM OIL

William E. Skelton and Howard V. Hess, Beacon, George B. Arnold, Glenham, and Boyd L. Mahan, Beacon, N. Y., assignors to The Texas Company, New York, N. Y., a corporation of Delaware Application March 17, 1949, Serial No. 81,926

1 Claim. (Cl. 196—17)

This invention relates to a continuous process for separation of wax-like constituents from oil such as contained in hydrocarbon mixtures by treatment with an organic agent such as urea.

The invention concerns a continuous process for separation of wax and wax-like constituents from oil by treatment with an organic complexing agent having the structure:

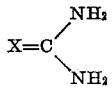

where X may be either oxygen or sulfur. Examples of effective compounds are urea, thiourea, and certain derivatives thereof which are capable of forming with waxy constituents of mineral oil solid crystalline complex compounds readily separable from the oil.

More specifically, the present invention involves subjecting the crystalline complex to treatment with a solvent liquid such as benzol and its homologs or a petroleum naphtha at an elevated temperature sufficient to decompose the complex with a solution of the waxy components of the complex in the solvent, leaving the complexing agent in solid particle form. Advantageously, the resulting mixture is subjected to filtration thereby obtaining a filter cake comprising recovered complexing agent in solid particle form. The filter cake material is then recycled into contact with fresh feed oil advantageously in the presence of a polar solvent liquid such as a low molecular weight aliphatic alcohol.

As disclosed in copending application Serial No. 75,542, filed February 10, 1949, now U. S. Patent 2,635,986, for improvements in Continuous Process for Separation of Wax-like Constituents From Oil, the aforesaid complexing agents such as urea are useful in effecting separation between wax and normally liquid constituents of wax-bearing mineral oil. In the case of separating wax from mineral oil the resulting crystalline complex appears to be a definite chemical compound consisting of approximately 25% wax and 75% urea by weight. The crystalline structure appears to involve a hexagonal system. Complex formation is facilitated by the presence of a small amount of alcohol, water or other polar liquid capable of dissolving urea. The complex forms at ordinary temperature, as for example, in the range normal room temperature up to about 125° F. and may be decomposed by heating to temperature in the range about 150 to 180° F. or higher in the presence of a wax solvent.

The invention of the present application is particularly concerned with the treatment of the resulting crystalline complex so as to recover the wax and also recover the complexing agent in a form particularly useful for recycling into contact with the fresh feed oil stream. The invention involves the discovery that the crystalline complex of wax and complexing agent such as urea may be treated with an aromatic hydrocarbon such as benzol, toluol, etc. or a petroleum fraction such as naphtha at elevated temperature and thereby liberate the wax as a solution in hydrocarbon solvent while leaving the complexing agent in crystalline form and, therefore, in a condition particularly suitable for recycling to the process.

Reference will now be made to the accompanying drawing wherein the process will be described with reference to the treatment of a lubricating oil distillate having a Saybolt Universal viscosity of about 300 seconds at 100° F. containing about 1% wax by volume and having a "Freon" haze test above minus 20° F. This haze test is determined by mixing the oil with "Freon" (dichloro difluoro methane) in the proportion of about 90% "Freon" and 10% oil by volume, chilling the mixture and observing the point at which wax haze appears.

Feed oil is conducted from a source not shown through a pipe 1 to a mixer 2 wherein it is brought into contact with urea in solid crystalline form, the urea being introduced to the mixer from a pipe 3 to which reference will be made later.

Alcohol, such as ethyl alcohol, is conducted into the mixer from a pipe 5 and to which reference will be made later.

The urea is added through pipe 3 in an amount equal to about 3 to 8 pounds of urea per pound of wax in the feed oil. The alcohol present in the mixer may be 0.1% to 20% by volume of the feed oil.

The mixing is effected at a temperature about 100° F., or in the range about 75 to 125° F. and as a result wax constituents of the oil enter into complex formation with the urea forming a crystalline complex.

The resulting mixture of the oil and alcohol and complex and excess urea is conducted through pipe 10 to a filter 11, advantageously of the continuous rotary drum-type operated under pressure. In any case, the filter apparatus is of conventional structure such as disclosed, for example, in U. S. Patent 2,449,902 granted to Wynkoop Kiersted.

Filtration is effected at the aforesaid temperature thereby obtaining a filter cake comprising crystalline complex and excess urea and a filtrate of oil substantially free from any undesired wax constituents. This filtrate is discharged through pipe 12 to a solvent recovery unit 13 indicated in broken lines wherein solvent alcohol is recovered from the oil. Since the oil may retain small residual amounts of urea, provision may be included in unit 13 for recovering this residual urea by washing with alcohol or by other means.

The filter cake may be washed in situ in the filter in the conventional manner to wash out retained mother liquor. This wash filtrate may be commingled with the main filtrate stream or may be separately treated.

The resulting washed filter cake is discharged from the filter and conducted through line 20 by means of a conveyor to a mixer 21 wherein it is brought into contact with benzol or toluol or naphtha fraction introduced from pipe 22. The contact with the hydrocarbon is effected at an elevated temperature in the range 150 up to 200° F. or higher and such that the complex breaks down with liberation of the wax as a solution in the hydrocarbon and leaving urea in crystalline form.

A heating coil may be provided in the mixer as indicated or other means may be provided for supplying the necessary heat.

The resulting mixture is removed from the mixer through pipe 25 to a second filter 26 wherein it is subjected to filtration so as to obtain a filter cake consisting essentially of urea crystals. This filter cake may also be subjected to washing with solvent liquid in situ and before discharge from the filter.

The resulting cake is removed through pipe 27 while the resulting filtrate containing wax dissolved in benzol is discharged through pipe 28 to a stripper 29.

In the stripper 29 the solvent liquid is stripped from the wax, the wax being discharged through pipe 30.

The aromatic hydrocarbon distillate is removed through pipe 31 condensed in cooler 32 and then conducted into pipe 22 previously referred to. Additional aromatic solvent may be supplied through pipe 33 to compensate for losses in this operation.

While not shown, provision may also be made for recovering any residual small amounts of urea carried out in the filtrate from the filter 26.

The filter cake discharged through pipe 27 may be returned by means of a conveyor to the mixer 2. While not shown, means may be provided for vaporization and recovery of aromatic hydrocarbons contained in the wax discharge from filter 26. Advantageously, it is commingled with alcohol such as recovered in the recovery unit 13. Thus, this recovered alcohol stream is conducted through pipe 40 indicated in broken lines and added to the filter cake, being discharged from the filter 26 in amounts sufficient to form a slurry of urea crystals suspended in alcohol. The resulting slurry is then conducted through pipe 41 communicating with pipe 3 previously referred to and thereby being recycled to the mixer 2.

The dewaxed oil product discharged from the recovery unit through pipe 43 will have a "Freon" haze of about minus 65 to minus 75° F.

In practice, it is advantageous to employ in the complexing zone, a low molecular weight aliphatic alcohol having 1 to 5 carbon atoms per molecule. Other polar solvent liquids may be used such as low molecular weight ketones and amines.

In the complex breaking operation other aromatic hydrocarbons besides those specifically mentioned may be employed as well as mixtures thereof. Any solvent may be employed which has a high solubility for wax at temperatures in the range 180 to about 200 or 250° F. and substantially no solvent action for the complexing agent at these temperatures.

Since the filter cake leaving filter 11 may retain some alcohol, provision may be made for removing it by washing or stripping prior to passage to mixer 21. For example, the cake from filter 11 can be subjected to countercurrent contact with flue gas at about 130 to 140° F. to evaporate the alcohol from the cake. The effluent gas stream can then be cooled and compressed to knock out the alcohol before recycling for re-use.

While mention has been made of applying the process to the treatment of low viscosity oil nevertheless it is contemplated that the process may be applied to the treatment of heavier oils and oils containing larger amounts of wax. It is contemplated that relatively viscous oils may be diluted with a low molecular weight petroleum hydrocarbon such as pentane, hexane or mixtures thereof or other naphtha hydrocarbons. The process may be carried out under sufficient pressure to permit the use of liquefied normally gaseous petroleum hydrocarbons as diluents.

The process of this invention is useful in the treatment of other oils and it is contemplated that it may be applied to the treatment of oils derived from non-mineral sources, such as from animal, vegetable and marine oils. It may be used for the separation of other than wax constituents, for example, urea enters into complex formation with oxygenated hydrocarbons and either aromatic or naphthenic-type hydrocarbons having relatively long aliphatic side chains. Thus, the process may be used to remove other undesired constituents from oils of various types such as gas oils for the manufacture of diesel fuels, jet fuels, etc.

The invention may have application in conjunction with conventional low temperature dewaxing operations either to effect preliminary removal of certain wax constituents prior to conventional dewaxing or to the removal of residual wax constituents from oil previously dewaxed at low temperatures.

While urea has been specifically mentioned, other substituted derivatives thereof such as ethanol urea, diethyl urea, butyl urea may be used.

Obviously many modifications and variations of the invention, as hereinbefore set forth, may be made without departing from the spirit and scope thereof, and, therefore, only such limitations should be imposed as are indicated in the appended claim.

We claim:

A continuous method of separating wax from wax-bearing mineral oil comprising subjecting said wax-bearing mineral oil to contact with urea in solid particle form at a temperature in the range of about 75 to 125° F. in the presence of a small amount of a polar solvent liquid, forming a mixture containing crystalline complex composed of wax constituents and urea, separating by filtration resulting complex from dewaxed oil and polar solvent, recovering polar solvent liquid from the dewaxed oil, subjecting separated complex to contact with benzol at a temperature in the range of about 150 to 200° F., thereby decomposing said complex to form a mixture comprising a solution of wax in benzol and urea in solid particle form, filtering said last mentioned mixture to separate therefrom a substantially wax-free filter cake of urea in solid particle form and retaining some benzol, commingling said cake retaining benzol with aforesaid recovered polar solvent liquid, and recycling said commingled mixture into contact with fresh feed oil.

WILLIAM E. SKELTON.
HOWARD V. HESS.
GEORGE B. ARNOLD.
BOYD L. MAHAN.

References Cited in the file of this patent

UNITED STATES PATENTS

| Number | Name | Date |
|---|---|---|
| 1,830,859 | Schotte et al. | Nov. 10, 1931 |
| 2,248,668 | Gee | July 8, 1941 |
| 2,499,820 | Fetterly | Mar. 7, 1950 |
| 2,546,328 | Arabian et al. | Mar. 27, 1951 |

OTHER REFERENCES

Technical Oil Mission, Reel 143. Translation by Shell Development Co., of German application B190,197 (Bengen), pages 2-6, May 22, 1946 (included in Index released May 31, 1946, pages 2-6 inclusive only).